United States Patent [19]

Ohmamyuda et al.

[11] Patent Number: 5,210,587
[45] Date of Patent: May 11, 1993

[54] OPTICAL DISTANCE MEASURING APPARATUS

[75] Inventors: Yukio Ohmamyuda, Sagamihara; Shigeru Kimura, Yokohama; Toru Tanabe, Machida; Kazuhisa Iwasaki, Yokohama; Takao Seto, Yokohama; Hideki Kitamura, Yokohama; Kazuhiko Sugimura, Yokohama; Yasushi Senoo, Yokohama, all of Japan

[73] Assignee: Stanley Electric Co., Ltd., Tokyo, Japan

[21] Appl. No.: 845,681

[22] Filed: Mar. 4, 1992

[30] Foreign Application Priority Data

Mar. 12, 1991 [JP] Japan .................... 3-72599

[51] Int. Cl.$^5$ .............................. G01C 3/08
[52] U.S. Cl. .............................. 356/5
[58] Field of Search ............... 356/5, 28.5; 342/127

[56] References Cited

U.S. PATENT DOCUMENTS

| 4,818,100 | 4/1989 | Breen | 356/5 |
| 4,861,158 | 8/1989 | Breen | 356/5 |
| 5,082,364 | 1/1992 | Russell | 356/5 |

FOREIGN PATENT DOCUMENTS 0395508 10/1990 European Pat. Off.
1154149 6/1969 United Kingdom.

Primary Examiner—Mark Hellner
Attorney, Agent, or Firm—Frishauf, Holtz, Goodman & Woodward

[57] ABSTRACT

An optical distance measuring apparatus operable in accordance with a phase difference detecting process, comprises a processing system including a central processing unit and first and second local oscillating circuits which serve to detect and calculate a phase difference between the electrical phase of a modulated signal outputted from a reference oscillator electrically connected to a light source via a modulating circuit and the electrical phase of a demodulated signal outputted from a demodulating circuit electrically connected to a light receiving portion so as to determine a distance between the apparatus and an object to be measured based on the detected phase difference with reference to the electrical phase of a reference signal outputted from the reference oscillator. A first local oscillating signal is outputted from the first local oscillating circuit and it is then subjected to frequency conversion together with the demodulated signal in a mixer so as to output a first intermediate frequency, while a second local oscillating signal is outputted from the second local oscillating circuit and it is then subjected to frequency conversion in a mixer together with the demodulated signal so as to output a second intermediate frequency signal. One of the first and second intermediate frequency signals is selected depending on the present distance between the apparatus and the object to be measured.

7 Claims, 1 Drawing Sheet

OPTICAL DISTANCE MEASURING APPARATUS

BACKGROUND OF THE INVENTION

1. Field of the Invention

The present invention relates generally to an optical distance measuring apparatus operable in accordance with a phase difference detecting process. More particularly, the present invention relates to an optical distance measuring apparatus of the aforementioned type wherein not only a distance between the apparatus and a stationary object but also a distance between the apparatus and a moving object can reliably be measured based on a phase difference between the electrical phase of a modulated signal associated with a distance measuring light beam to be emitted from a light source and the electrical phase of a demodulated signal derived from a reflected light beam reflected from the object. Further, the present invention relates to an optical distance measuring apparatus of the aforementioned type wherein a speed of a moving object can be measured with reference to the measured distance between the apparatus and the moving object.

2. Description of the Prior Art

To facilitate understanding of the present invention, a typical conventional optical distance measuring apparatus of the aforementioned type will briefly be described below with reference to FIG. 2. It should be noted that illustration of an optical system of the apparatus is neglected for the purpose of simplification, because the optical system employable for the optical distance measuring apparatus is well known to those skilled in the art and it is believed that a particular detailed description of the optical system is not required.

Referring to FIG. 2, the apparatus includes an optical intensity modulating circuit 1 and a reference oscillator 2. A reference signal outputted from the reference oscillator 2 is modulated in the optical intensity modulating circuit 1 so as to allow a modulated distance measuring light beam L-1 to be emitted toward an object to be measured (not shown) from a light source (not shown) electrically connected to the optical intensity modulating circuit 2. Subsequently, a reflected light beam L-2 reflected from the object to be measured is received by a light receiving element (not shown) which in turn activates a demodulating circuit 6 and a filter 7. The demodulated signal derived from the reflected light beam L-2, the modulated signal modulated in the light intensity modulating circuit 1 and the locally oscillated signal outputted from a local oscillator 3 are inputted into mixers 4 and 5, respectively, in which these signals are subjected to frequency conversion.

Thereafter, a phase difference between the electrical phase of the modulated signal and the electrical phase of the demodulated signal is detected and calculated with reference to the electrical phase of the locally oscillated signal with the aid of a phase meter 8 so as to determine a distance between the apparatus and the object.

The conventional optical distance measuring apparatus constructed in the above-described manner is basically constructed in order to measure a distance between the apparatus and a certain stationary object with a high accuracy. For this reason, there does not arise any particular problems even though several seconds are taken until a single distance measuring operation is completed.

In practice, a plurality of modulated signals are used for performing a distance measuring operation for measuring a distance of order of several kilometers between the apparatus and the object with an accuracy represented by a millimeter as a unit. To assure that data representing the distance therebetween are reliable in respect of accuracy, a number of distance measuring operations are successively performed and the results derived from the successive distance measuring operations are averaged so as to obtain an average value. Then, this average value is practically used as a reliable value representing the distance between the apparatus and the object to be measured with a high accuracy.

However, in a case where a distance between the apparatus and a moving object is to be measured, there arises a problem that a measuring operation should be completed in a shorter period of time rather than with a high accuracy.

In view of the above-noted problem, when a distance between the apparatus and a moving object is measured with the conventional optical distance measuring apparatus as mentioned above, it is necessary that a number of measuring operations are successively performed while using the corresponding number of frequencies, causing a long time to be taken until a single datum representing the measured distance is obtained. For this reason, it is not satisfactorily acceptable to employ the conventional optical distance measuring apparatus when a distance between the apparatus and a moving object is to be measured.

SUMMARY OF THE INVENTION

The present invention has been made with the foregoing background in mind.

An object of the present invention is to provide an optical distance measuring apparatus operable in accordance with a phase difference detecting process wherein a distance between the apparatus and a moving object can be measured easily.

Another object of the present invention is to provide an optical distance measuring apparatus of the aforementioned type which assures that not only a distance between the apparatus and a moving object but also a distance between the apparatus and a stationary object can be measured with a high accuracy.

Another object of the present invention is to provide an optical distance measuring apparatus of the aforementioned type which assures that a speed of a moving object can be measured with a high accuracy with reference to the measured distance between the apparatus and the moving object.

According to the present invention, there is provided an optical distance measuring apparatus operable in accordance with a phase difference detecting process, wherein the apparatus comprises a light emitting portion including a light source from which a distance measuring light beam is emitted toward an object to be measured; an optical lens system for allowing the distance measuring light beam to be oriented to the object to be measured from which the distance measuring light beam is reflected in the form of a reflected light beam; a light receiving portion for receiving a reflected light beam reflected from the object to be measured through the optical lens system; and a processing system including a central processing unit and at least two local oscillating circuits for detecting and calculating a phase difference between the electrical phase of a modulated signal outputted from a reference oscillator electrically connected to the light source via a modulating circuit and the electrical phase of a demodulated signal outputted from a demodulating circuit electrically connected to the light receiving portion so as to determine a distance between the apparatus and the object to be measured based on the detected phase difference with reference to the electrical phase of a reference signal outputted from the reference oscillator.

In consideration of practical use, it is preferred that the local oscillating circuit comprises a first local oscillating circuit from which a first local oscillating signal is outputted and a second local oscillating circuit from which a second local oscillating signal is outputted. In this connection, a first mixer and a second mixer are electrically connected to the first local oscillating circuit, while a third mixer and a fourth mixer are electrically connected to the second local oscillating circuit.

The first local oscillating signal is inputted into the first and second mixers, the demodulated signal is inputted into the second mixer and the reference signal is inputted into the first mixer so that the first local oscillating signal and the reference signal are subjected to frequency conversion in the first mixer, and the first local oscillating signal and the demodulated signal are subjected to frequency conversion in the second mixer so as to output a first intermediate frequency signal from each of the first and second mixers. In addition, the second local oscillating signal is inputted into the third and fourth mixers, the demodulated signal is inputted into the fourth mixer and the reference signal is inputted into the third mixer so that the second local oscillating signal and the reference signal are subjected to frequency conversion in the third mixer, and the second local oscillating signal and the demodulated signal are subjected to frequency conversion in the fourth mixer so as to output a second intermediate frequency signal from each of the third and fourth mixers.

Subsequently, the first intermediate frequency signal and the second intermediate frequency signal are inputted into the central processing unit via a multiplexer and a phase meter so as to allow the central processing unit to calculate a distance between the apparatus and the object to be measured based on the detected phase difference with reference to the electrical phase of a reference signal outputted from the reference oscillator.

It should be noted that another output from the reference oscillator is inputted into the phase detector in the form of a reference signal so as to allow the phase difference to be determined with reference to the electrical phase of the reference signal.

When the apparatus is practically used, one of the first intermediate frequency signal and the second intermediate frequency signal is selected dependent on the present distance between the apparatus and the object to be measured for the purpose of properly determining a distance between the apparatus and the object to be measured in consideration of the present distance.

Other objects, features and advantages of the present invention will become apparent from reading of the following description which has been made in conjunction of the following drawings.

DESCRIPTION OF THE PREFERRED EMBODIMENT

Now, the present invention will be described in detail hereinafter with reference to the accompanying drawings which illustrates a preferred embodiment of the present invention.

Figure 2:
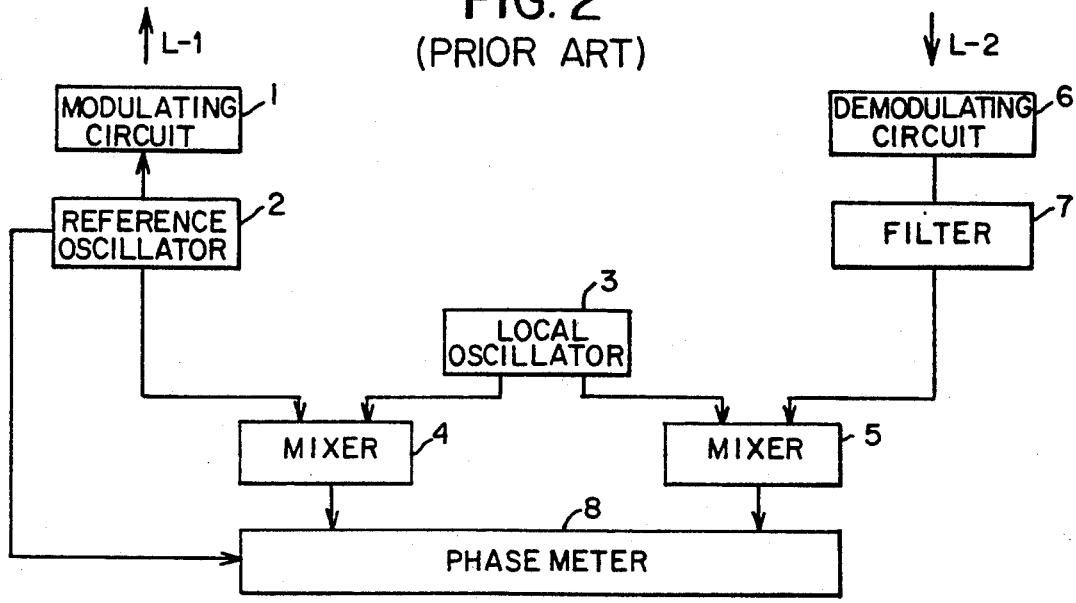
FIG. 2 is a block diagram of a conventional optical distance measuring apparatus of the aforementioned type, particularly illustrating the whole structure of circuits constituting the apparatus.

In general, a process of optically measuring a distance is usually classified into four processes, one of them being a light wave interference process wherein the wavelength of a light beam is taken as a reference representing a certain length, another one being an optical intensity modulating process wherein a light beam having a constant optical intensity is converted into a strong/weak light beam by employing certain means or the wavelength of a light beam which is determined dependent on the modulated frequency of the light beam specific to a light source adapted to output a strong/weak light beam is taken as a reference, another one being a phase difference detecting process wherein a phase difference between the electrical phase of a modulated signal associated with a distance measuring light beam to be emitted from a light source and the electrical phase of a demodulated signal derived from a reflected light beam received by a light receiving portion is detected and calculated to determine a distance, and yet another one being a process wherein a long distance is measured by utilizing the speed of a light beam. Here, it should be noted that the phase difference detecting process briefly described above with reference to FIG. 2 is employed to carry out the present invention. In other words, an optical distance measuring apparatus, to which the present invention is applied, is adapted to operate in accordance with the phase difference detecting process.

Figure 1:
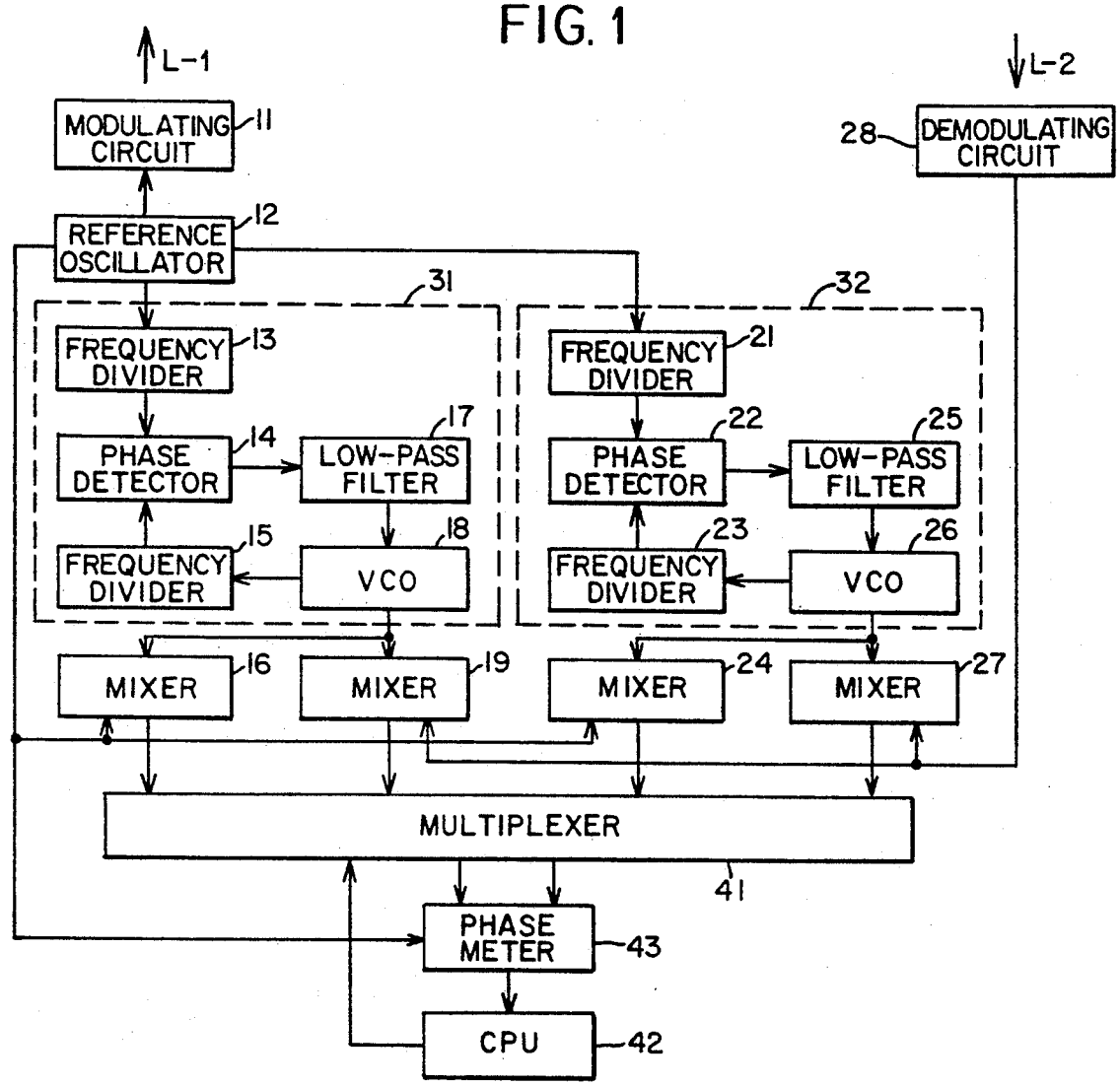
FIG. 1 is a block diagram of an optical distance measuring apparatus operable in accordance with a phase difference detecting process according an embodiment of the present invention, particularly illustrating the whole structure of circuits constituting the apparatus.

FIG. 1 is a block diagram of an optical distance measuring apparatus operable in accordance with a phase difference measuring process according to an embodiment of the present invention, particularly illustrating the whole structure of circuits constituting the apparatus. It should be noted that illustration of an optical system of the apparatus is neglected for the purpose of simplification, i.e., for the same reason as the conventional optical distance measuring apparatus described above with reference to FIG. 2.

In the drawing, reference numeral 11 designates an optical intensity modulating circuit from which a distance measuring light beam L-1 is emitted toward an object (not shown), reference numeral 12 designates a reference oscillator, reference numeral 13 designates a first frequency divider, reference numeral 14 designates a phase detector, reference numeral 15 designates a second frequency divider, reference numeral 16 designates a first mixer, reference numeral 17 designates a first low-pass filter, reference numeral 18 designates a first voltage controlled oscillator (VCO) and reference numeral 19 designates a second mixer. As is apparent from FIG. 1, a first local oscillating circuit 31 restrictively defined by a dashed line box in the drawing comprises the first frequency divider 13, the phase detector 15, the second frequency divider 15, the first low-pass filter 17 and the first voltage controlling oscillator 18.

In addition, reference numeral 21 designates a third frequency divider, reference numeral 22 designates a second phase detector, reference numeral 23 designates a fourth frequency divider, reference numeral 24 designates a third mixer, reference numeral 25 designates a second low-pass filter, reference numeral 26 designates a second voltage controlled oscillator (VCO), reference numeral 27 designates a fourth mixer and reference numeral 28 designates a demodulating circuit which serves as a light receiving portion for receiving and demodulating a light bean L-2 reflected from the object. Similarly, a second local oscillating circuit 32 likewise restrictively defined by a dashed line box in the drawing comprises the third frequency divider 21, the second phase detector 22, the fourth frequency divider 22, the fourth frequency divider 23, the second low-pass filter 25 and the second local oscillator 26.

When the reference oscillator 12 is activated, an output from the reference oscillator 12 is inputted into the light intensity modulating circuit 11 in the form of a reference signal from which a distance measuring light beam L-1 is emitted toward an object to be measured (not shown), while another output from the same is inputted not only into the first frequency divider 13 constituting the first local oscillating circuit 32 in the form of a reference signal but also into the first mixer 16 via the phase detector 14, the first low-pass filter 17 and the first voltage controlling oscillator 18 also in the form of a reference signal. In addition, an output from the reference oscillator 12 is inputted not only into the third frequency divider 21 constituting the second local oscillating circuit 32 in the form of a reference signal but also into the third mixer 24 via the second phase detector 22, the second low-pass filter 25 and the second voltage controlling oscillator 26 also in the form of a reference signal.

On the other hand, an output from the demodulating circuit 28 for demodulating a reflected light beam L-2 reflected from a target (not shown) is inputted not only into the second mixer 19 on the first local oscillating circuit 31 side but also into the fourth mixer 27 on the second local oscillating circuit 32 side.

Specifically, the first local oscillating circuit 31 is constructed such that as the reference oscillator 12 is activated, a modulated signal outputted from the same is inputted into the first local oscillating circuit 31 as a first local oscillating signal to serve as a reference signal which in turn is inputted into the first and second mixers 16 and 19. On the other hand, the second local oscillating circuit 32 is constructed such that the modulating signal outputted from the reference oscillator 12 is inputted into the second local oscillating circuit 32 as a second local oscillating signal to serve as a reference signal which in turn is inputted into the third and fourth mixers 24 and 27.

The first local oscillating signal which has been inputted into the first and second mixers 16 and 19 from the first local oscillating circuit 31 and the modulated signal which has been inputted into the first mixer 16 from the reference oscillator 12 are subjected to frequency conversion in the first and second mixers 16 and 19. In addition, the first local oscillating signal which has been inputted into the first and second mixers 16 and 19 and the demodulated signal which has been inputted into the second mixer 19 from the demodulating circuit 28 are likewise subjected to frequency modulation in the first and second mixers 16 and 19. Then, the resultant two signals are outputted from the first and second mixers 16 and 19 as a first intermediate frequency signal which in turn is inputted into a multiplexer 41.

Similarly, the second local oscillating signal which has been inputted into the third and fourth mixers 24 and 27 from the second local oscillating circuit 32 and the modulated signal which has been inputted into the third mixer 24 from the reference oscillator 12 are subjected to frequency conversion in the third and fourth mixers 24 and 27. In addition, the second local oscillating signal which has been inputted into the fourth mixer 27 and the demodulated signal which has been inputted into the fourth mixer 27 from the demodulating circuit 28 are likewise subjected to frequency conversion in the third and fourth mixers 24 and 27. Then, the resultant two signals are outputted from the third and fourth mixers 24 and 27 as a second intermediate frequency signal which in turn is inputted into the multiplexer 41.

In response to a control signal outputted from a central processing unit (hereinafter referred to simply as a CPU) 42, one of the first and second intermediate frequency signals is selected dependent on a distance to be optically measured. Subsequently, the selected intermediate frequency signal is inputted into a phase meter 43.

As is apparent from FIG. 1, an output from the reference oscillator 12 is inputted also into the phase meter 43 as a reference signal so that a phase difference between the electrical phase of the first intermediate frequency signal and the electrical phase of the second intermediate frequency signal is detected with reference to the electrical phase of the reference signal. Subsequently, data representing the detected phase difference are transmitted to the CPU 42 in which they are processed to determine a distance between the apparatus and an object to be measured based on the data obtained from the phase meter 43 to represent the aforementioned phase difference.

As described above, according to the present invention, the optical distance measuring apparatus is constructed such that a modulated signal and a demodulated signal are converted into intermediate frequency signals and one of the intermediate frequency signals is then selected dependent on a distance between the apparatus and an object to be measured so as to determine the distance therebetween with reference to a phase difference between the electrical phase of the selected intermediate frequency signal and the electrical phase of the reference signal outputted from a reference oscillator. While a frequency of each pulse used to calculate the phase difference is kept constant, a minimum resolution of the phase difference attainable by the apparatus is undesirably deteriorated in inverse proportion to the number of each intermediate frequency but a time consumed for determining the phase difference is shortened in inverse proportion to the number of each intermediate frequency. Consequently, each distance measuring operation can be performed with the apparatus within a short period of time.

The present invention has been described above with respect to an embodiment wherein two intermediate frequency signals are used for measuring a distance between the apparatus and an object to be measured. However, the present invention should not be limited only to this embodiment. Alternatively, three or more intermediate frequency signals may be used for carrying out the present invention. In this connection, it should be added that various changes or modifications may be made with respect to the apparatus without departure from the scope of the present invention as defined by the appended claims.

What is claimed is:

1. An optical distance measuring apparatus operable in accordance with a phase difference detecting process, comprising:
   a light emitting portion including a light source from which a distance measuring light beam is emitted toward an object to be measured, and including means for allowing said distance measuring light beam to be oriented relative to said object to be measured, said distance measuring light beam being reflected from said object in the form of a reflected light beam;
   a light receiving portion for receiving a reflected light beam reflected from said object to be measured;
   a processing system including a central processing unit coupled to at least two local oscillating circuits for detecting and calculating a phase difference between an electrical phase of a modulated signal outputted from a reference oscillator electrically connected to said light emitting portion via a modulating circuit and an electrical phase of a demodulated signal outputted from a demodulating circuit electrically connected to said light receiving portion so as to determine a distance between said distance measuring apparatus and said object to be measured based on the detected phase difference with reference to the electrical phase of a reference signal outputted from said reference oscillator;
   said at least two local oscillating circuits comprising a first local oscillating circuit from which a first local oscillating signal is outputted and a second local oscillating circuit from which a second local oscillating signal is outputted;
   a first mixer and a second mixer electrically coupled to an output of said first local oscillating circuit; and
   a third mixer and a fourth mixer electrically coupled to an output of said second local oscillating circuit.

2. The apparatus as claimed in claim 1, wherein:
   said first local oscillating signal is inputted into said first and second mixers, said demodulated signal is inputted into said second mixer, and said reference signal is inputted into said first mixer so that said first local oscillating signal and said reference signal are subjected to frequency conversion in said first mixer, and said first local oscillating signal and said demodulated signal are subjected to frequency conversion in said second mixer so as to output a first intermediate frequency signal from each of said first and second mixers; and
   said second local oscillating signal is inputted into said third and fourth mixers, said demodulated signal is inputted into said fourth mixer, and said reference signal is inputted into said third mixer so that said second local oscillating signal and said reference signal are subjected to frequency conversion in said third mixer, and said second local oscillating signal and said demodulated signal are subjected to frequency conversion in said fourth mixer so as to output a second intermediate frequency signal from each of said third and fourth mixers.

3. The apparatus as claimed in claim 2, further comprising:
   a multiplexer coupled to outputs of said first, second, third and fourth mixers;
   a phase meter coupled between said multiplex and said central processing unit;
   wherein said first intermediate frequency signal and said second intermediate frequency signal are inputted into said central processing unit via said multiplexer and said phase meter so as to allow said central processing unit to calculate a distance between said apparatus and said object to be measured based on the detected phase difference with reference to the electrical phase of a reference signal outputted from said reference oscillator.

4. The apparatus as claimed in claim 3, wherein said reference oscillator outputs another output which is inputted into said phase detector in the form of a reference signal so as to allow said phase difference to be determined with reference to the electrical phase of said reference signal.

5. The apparatus as claimed in claim 4, comprising means for selecting one of said first intermediate frequency signal and said second intermediate frequency signal dependent on a present distance between said distance measuring apparatus and said object to be measured for the purpose of determining a distance between said distance measuring apparatus and said object to be measured in consideration of the present distance therebetween.

6. The apparatus as claimed in claim 2, comprising means for selecting one of said first intermediate frequency signal and said second intermediate frequency signal dependent on a present distance between said distance measuring apparatus and said object to be measured for the purpose of determining a distance between said distance measuring apparatus and said object to be measured in consideration of the present distance therebetween.

7. The apparatus as claimed in claim 3, comprising means for selecting one of said first intermediate frequency signal and said second intermediate frequency signal dependent on a present distance between said distance measuring apparatus and said object to be measured for the purpose of determining a distance between said distance measuring apparatus and said object to be measured in consideration of the present distance therebetween.

* * * * *